(12) United States Patent
Church, IV et al.

(10) Patent No.: US 11,175,848 B2
(45) Date of Patent: Nov. 16, 2021

(54) SELF-DETERMINATION FOR IN-PROGRESS VOLUME DRAINING

(71) Applicant: International Business Machines Corporation, Armonk, NY (US)

(72) Inventors: Walter Church, IV, Binghamton, NY (US); Kevin Scott Adams, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/832,054

(22) Filed: Mar. 27, 2020

(65) Prior Publication Data

US 2021/0303475 A1    Sep. 30, 2021

(51) Int. Cl.
| | |
|---|---|
| G06F 12/00 | (2006.01) |
| G06F 3/06 | (2006.01) |
| G06F 12/0891 | (2016.01) |
| G06F 12/0882 | (2016.01) |
| G06F 12/02 | (2006.01) |
| G06F 11/34 | (2006.01) |
| G06F 9/50 | (2006.01) |
| G06F 11/30 | (2006.01) |

(52) U.S. Cl.
CPC .......... *G06F 3/0647* (2013.01); *G06F 9/5016* (2013.01); *G06F 9/5022* (2013.01); *G06F 11/3037* (2013.01); *G06F 11/3466* (2013.01); *G06F 12/0246* (2013.01); *G06F 12/0882* (2013.01); *G06F 12/0891* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 9,122,537 B2 | 9/2015 | Patel et al. | |
| 9,122,765 B1 | 9/2015 | Chen | |
| 2013/0054813 A1* | 2/2013 | Bercovici | G06F 9/4856 709/226 |
| 2015/0277542 A1 | 10/2015 | Chinnakkonda Vidyapoornachary et al. | |
| 2017/0038980 A1 | 2/2017 | Lagar Cavilla et al. | |

OTHER PUBLICATIONS

IBM, "Remarks Accompanying Filing of Application", Mar. 20, 2020, 1 page.
Mell et al., "The NIST Definition of Cloud Computing", Recommendations of the National Institute of Standards and Technology, Special Publication 800-145, Sep. 2011, 7 pages.

* cited by examiner

*Primary Examiner* — Daniel D Tsui
(74) *Attorney, Agent, or Firm* — Edward J. Wixted, III

(57) ABSTRACT

In an approach, a processor receives a request to vacate a first page volume of a plurality of page volumes. A processor causes data stored to the first page volume to be moved to a second page volume of the plurality of page volumes. A processor monitors paging rate between a primary storage device and the plurality of page volumes. A processor, responsive to the paging rate exceeding a first predetermined threshold, adjusts a rate of data transfer from the first page volume to the second page volume.

20 Claims, 8 Drawing Sheets

SELF-DETERMINATION FOR IN-PROGRESS VOLUME DRAINING

BACKGROUND

The present invention relates generally to the field of virtual machines (VMs), and more particularly to self-determination for monitoring and adjusting in-progress volume draining based on available capacity and/or paging rates.

Many computer systems provide for partitioning. Partitioning, which is most typically implemented in server systems, divides the available system resources into logically partitioned groups. In particular, memory devices, processors, and input/output (I/O) devices are logically partitioned into independent, secure groups of resources. An independent operating system (OS) image typically runs on each partition, or VM, allowing for multiple OSs to concurrently execute on a computer system, and allowing each VM to function independently of other VMs executing on the computer system.

Paging is a memory management scheme by which a computing device stores and retrieves data from secondary storage for use by primary storage (e.g., main memory). Data is retrieved from secondary storage in same-size blocks called pages. A page is the smallest unit of data for memory management in a virtual memory operating system. A page frame is the smallest fixed-length contiguous block of physical memory into which pages are mapped by the operating system.

SUMMARY

Aspects of an embodiment of the present invention disclose a method, computer program product, and computer system. A processor receives a request to vacate a first page volume of a plurality of page volumes. A processor causes data stored to the first page volume to be moved to a second page volume of the plurality of page volumes. A processor monitors paging rate between a primary storage device and the plurality of page volumes. A processor, responsive to the paging rate exceeding a first predetermined threshold, adjusts a rate of data transfer from the first page volume to the second page volume.

DETAILED DESCRIPTION

Figure 1:
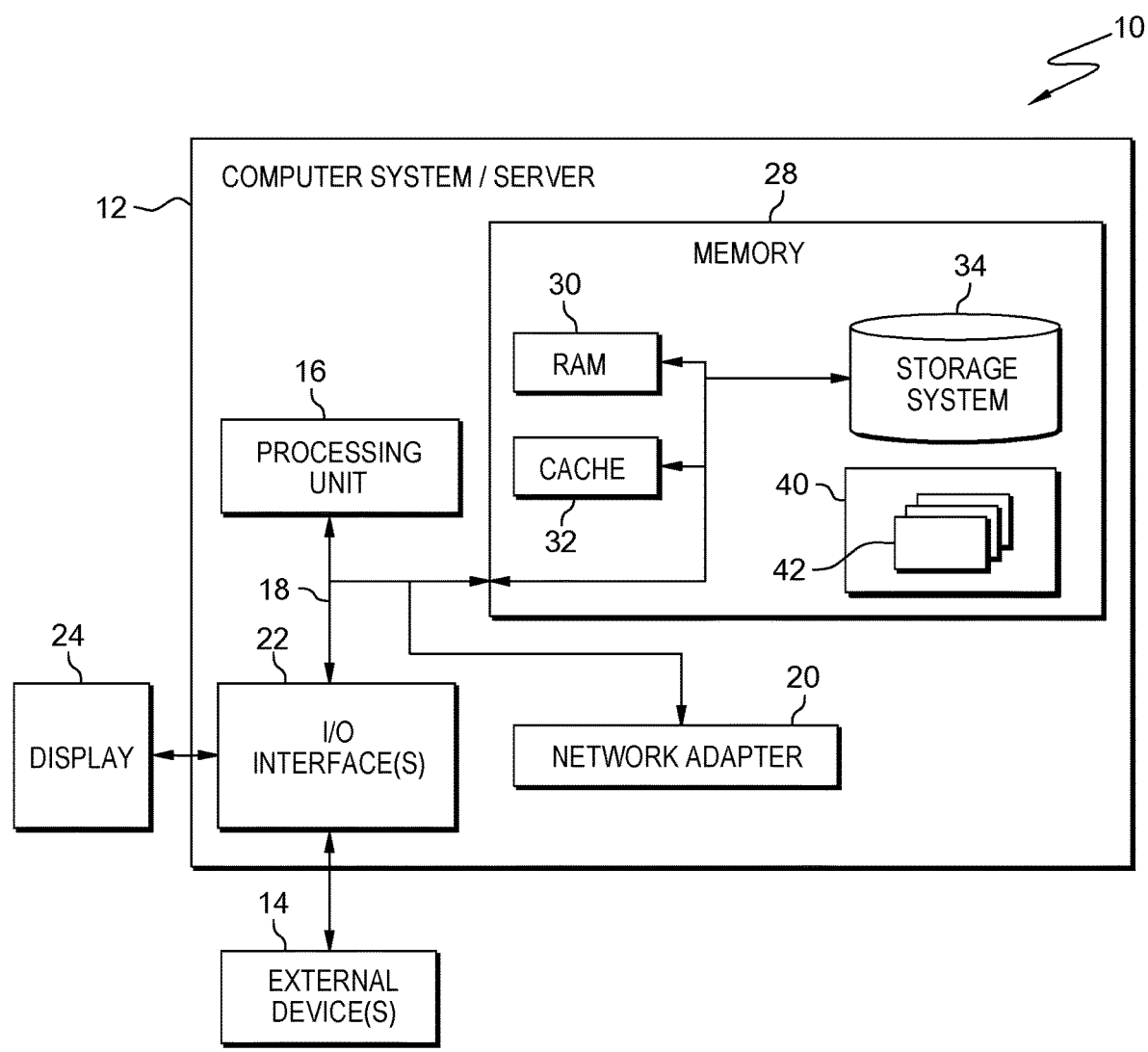
FIG. 1 depicts a cloud computing node according to an embodiment of the present invention.

Embodiments of the present invention recognize that, in a virtual machine (VM) environment, if the virtual memory of logged in guests exceeds the physical memory of the system, overcommitment of memory occurs and, typically, pages of real memory will be paged out to a secondary storage, such as one or more page volumes. Embodiments of the present invention recognize that one may want to remove a page volume as the system is running to, for example, upgrade hardware, perform maintenance tasks, or otherwise service equipment. Embodiments of the present invention further recognize that, in order to prevent data loss, a page volume cannot be removed from the system until data stored to the page volume has been drained (i.e., removed from the page volume and moved to one or more active page volumes and/or real memory of the system). Embodiments of the present invention also recognize that, as such draining occurs, system processes due to, for example, VM guest activity, may cause changes in paging rates that could impact the available capacity of active page volumes and/or the primary storage (e.g., real memory). Embodiments of the present invention further recognize that an operator may not be able to recognize that page volumes are reaching capacity because of the speed of data transfer and/or activity of active guests. Therefore, embodiments of the present invention recognize that a solution is required to monitor draining of page volumes that have been requested to be removed from available secondary memory, and, if necessary, adjust transfer rates of data to other active page volumes and/or primary storage.

As used herein, the terms VM and logical partition (LPAR) are used interchangeably and refer to a LPAR being managed by a partition manager.

A partition manager, such as a hypervisor, is implemented by computer software, firmware, and/or hardware, and can create and run VMs. A hypervisor forms LPARs from the physical resources that make up partitioned hardware 110. A hypervisor is typically allocated an amount of real memory (also referred to herein as "storage") available for allocation to the VMs. At least a portion of the memory (e.g., reconfigurable memory increments) can be added and removed from each VM dynamically while the system is running. Before the memory can be removed from a VM, its contents must be moved elsewhere, either to other memory increments and/or to secondary storage (e.g., page volumes). The process of moving the contents of a memory increment from one storage location to another is referred to as vacating memory, draining, and/or paging. After the memory is vacated, the hypervisor can remove the memory from the VM and return it to a pool of storage that is available for other uses (e.g., reconfigurable storage). In some embodiments, after data is vacated from, for example, a secondary storage device (e.g., page volume), the physical hardware associated with the secondary storage device can be removed from the system (e.g., when servicing/upgrading is required). In some embodiments, the removal of memory, or memory reclamation, must be performed on set memory sizes (e.g., increment sizes).

If, for example, there are more guests logged on that require more virtual memory than that of the real memory of the system, then an overcommitment of memory will happen and some of the memory will be paged out to secondary storage (e.g., page volumes, paging space). Administrative tasks may also page out data to secondary storage even without overcommitment. Embodiments of the present invention recognize the use of any known approach to paging. In some embodiments, paging involves a number of system components handling the movement of pages and several tables that keep track of the most current version of each page. For example, dynamic address translation (DAT) hardware, as well as segment and page tables that support address translation, can be used. In some embodiments, paging space is assigned to a VM by a system administrator. If paging space becomes full, a system outage may occur.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
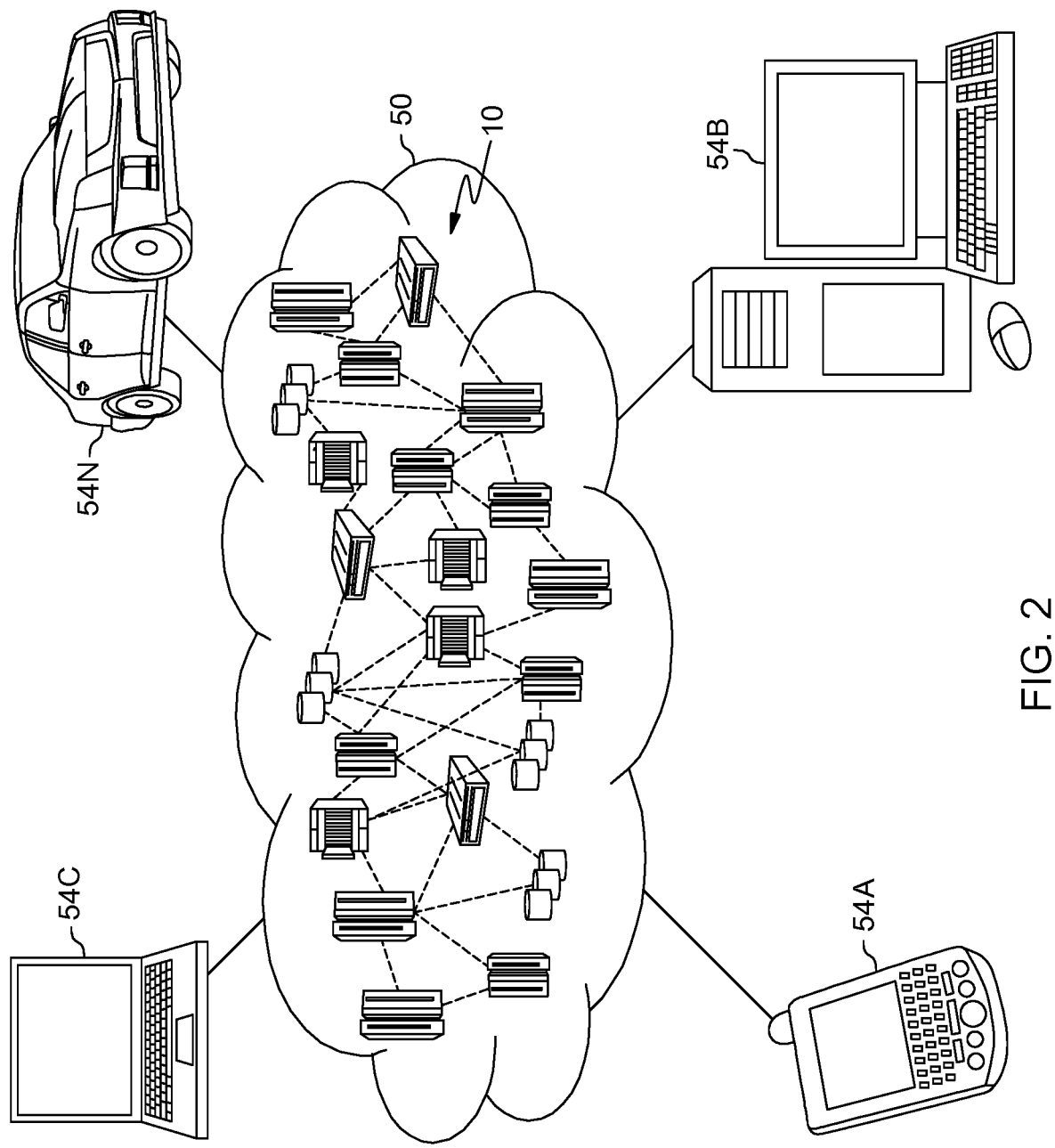
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
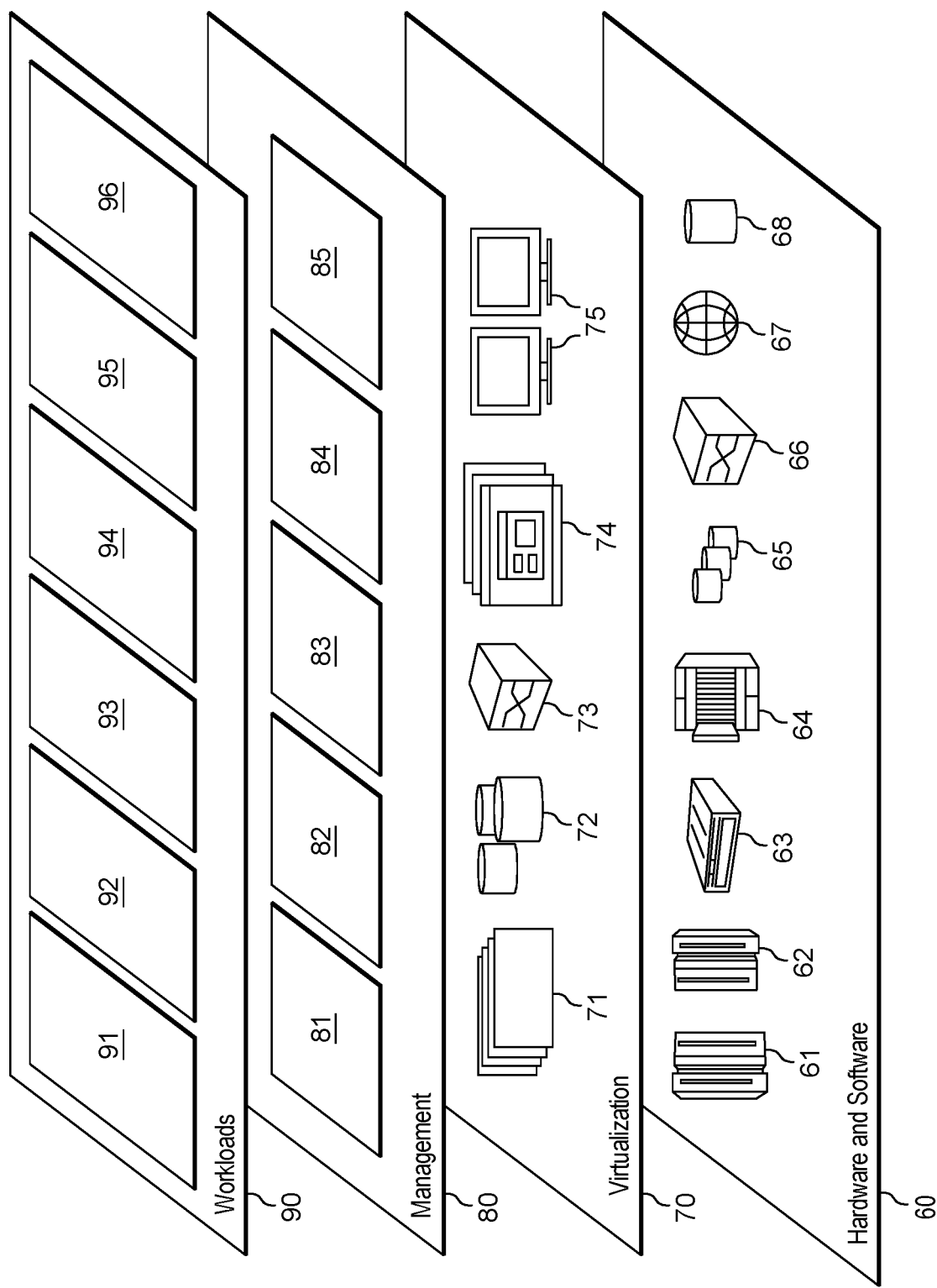
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
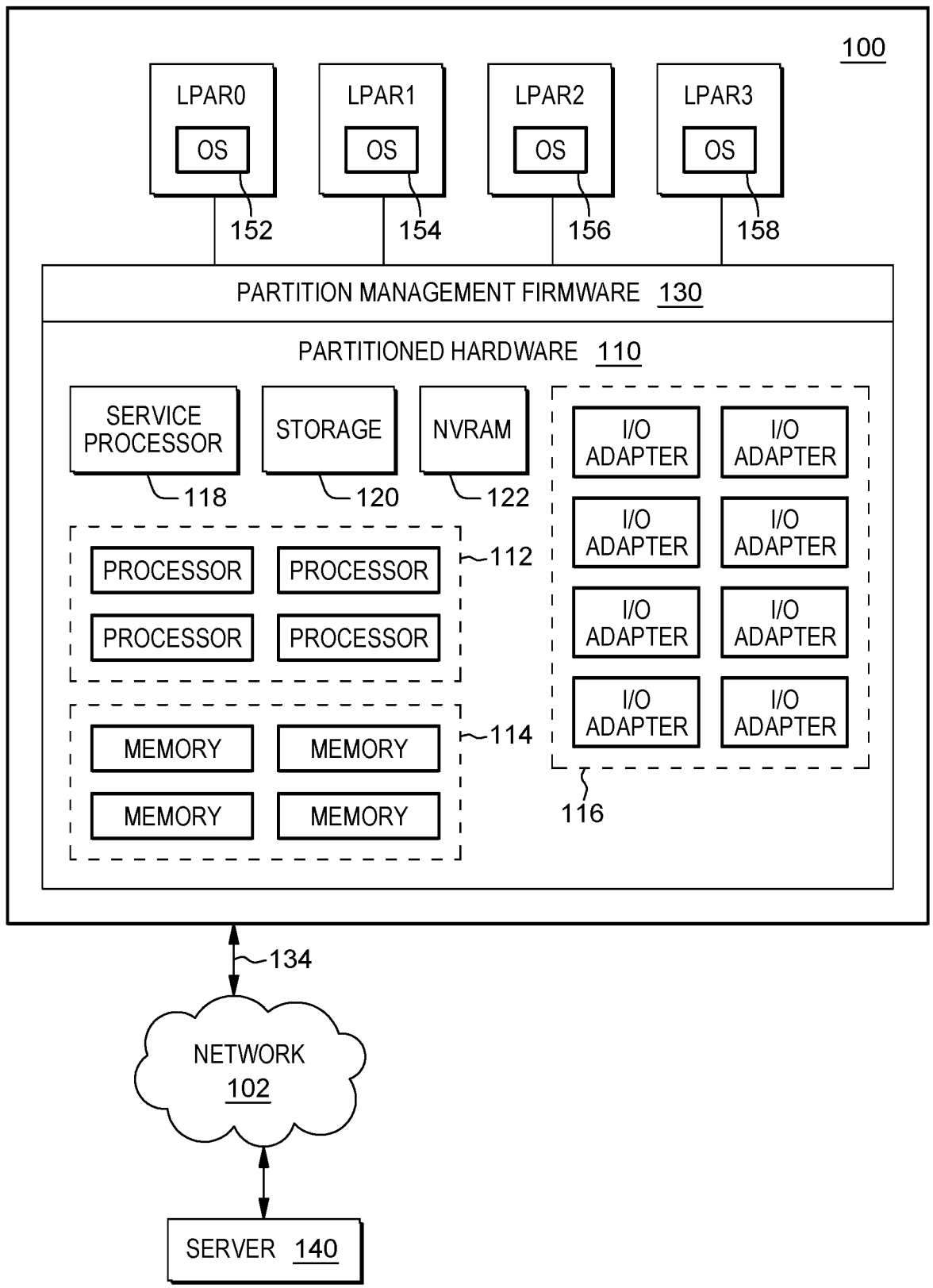
FIG. 4 depicts a block diagram of a logically partitioned data processing system according to an embodiment of the present invention.

The present invention will now be described in detail with reference to the Figures. FIG. 4 is a functional block diagram illustrating a logically partitioned data processing environment (i.e., data processing system 100), in accordance with one embodiment of the present invention.

Data processing system 100 may include internal and external hardware components, as depicted and described with respect to FIG. 1. Data processing system 100 includes partitioned hardware 110. Partitioned hardware 110 includes the hardware components of data processing system 100 that can be allocated into LPARs (e.g., LPAR0, LPAR1, LPAR2, LPAR3) and managed by partition management firmware 130 (e.g., a hypervisor). For purposes of example, data processing system 100 is described with reference to the partitioned hardware, rather than a schematic showing how components of the hardware are interconnected. It will be understood, however, that the hardware components within partitioned hardware 110 of data processing system 100 are connected by multiple buses or other communication devices for communicating information within data processing system 100. The buses, for example, may include low-latency and higher latency paths connected by bridges and adapters and controlled by multiple controllers (not depicted). Further, it will be understood that in addition to the components illustrated in data processing system 100, additional components may be implemented within data processing system 100.

Within partitioned hardware 110, multiple hardware components include processors 112, storage 120, memory units 114, and I/O adapters 116. Processors 112 may be general-purpose processors, such as, but not limited to, processors that, during normal operation, process data under the control of operating system (OS) and application software accessible from a dynamic storage device such as random access memory (RAM) and a static storage device such as read only memory (ROM) built-in with each processor. In addition, memory units 114 may include multiple types of volatile and non-volatile memory which are partitioned and accessible to the processors 112.

Storage 120 may be a direct-access storage device (DASD), which is a secondary storage device in which each physical record has a discrete location and a unique address. DASD may comprise hard disk drives, magnetic drums, data cells, optical disc drives, flash memory. However, embodiments of the present invention recognize that storage 120 may also include sequential storage media such as magnetic tape. In some embodiments, memory units 114 may have smaller capacity but faster access speeds as compared to storage 120 and/or storage located on server 140. In some embodiments, storage 120 and/or storage located on server 140 may be removable from data processing system 100 and/or server 140.

In one example, memory units 114 may include on-demand memory that is activated and allocated only when needed by data processing system 100. In addition, in one example, on-demand memory or storage from other server systems (e.g., server 140), via a network such as network 102 or cloud, may be made available to the LPARs of FIG. 1.

In the embodiment shown in FIG. 4, data processing system 100 includes four logical partitions LPARs, where each LPAR, or VM, includes a portion of available processors 112, I/O adapters 116, and memory units 114. A separate OS instance executes within each LPAR. For example, OS 152 operates in LPAR0, OS 154 operates in LPAR1, OS 156 operates in LPAR 2, and OS 158 operates in LPAR3. It will be understood that while data processing system 100 is defined to include four LPARs, resources are not automatically allocated for four LPARs. Further, it will be understood that any number of LPARs may be defined for a data processing system depending on the amount of resources available in the data processing system and the minimum required resource allocation for an LPAR. In particular, configurable determinations can be made for different partition implementations.

In one example of the implementation of a partition management layer, non-volatile random-access memory (NVRAM) 122 may store a table identifying resource allocation among the LPARs (e.g., LPAR0-LPAR3). Partition management firmware 130, executing on service processor 118, accesses the table from NVRAM 122 to provide for memory mapping and other partition security measures.

In accordance with one or more embodiments, computer instructions to execute processes corresponding to embodiments of the present invention are located in the partition management firmware 130. It will be understood that partition management firmware 130 may be implemented using a hypervisor or other middleware enabled to allocate and control partitions within a data processing system. Furthermore, it will be understood that while the depicted embodiment describes partition management firmware 130 as firmware, in other embodiments, partition management firmware 130 may be implemented via software and/or hardware.

Figure 5:
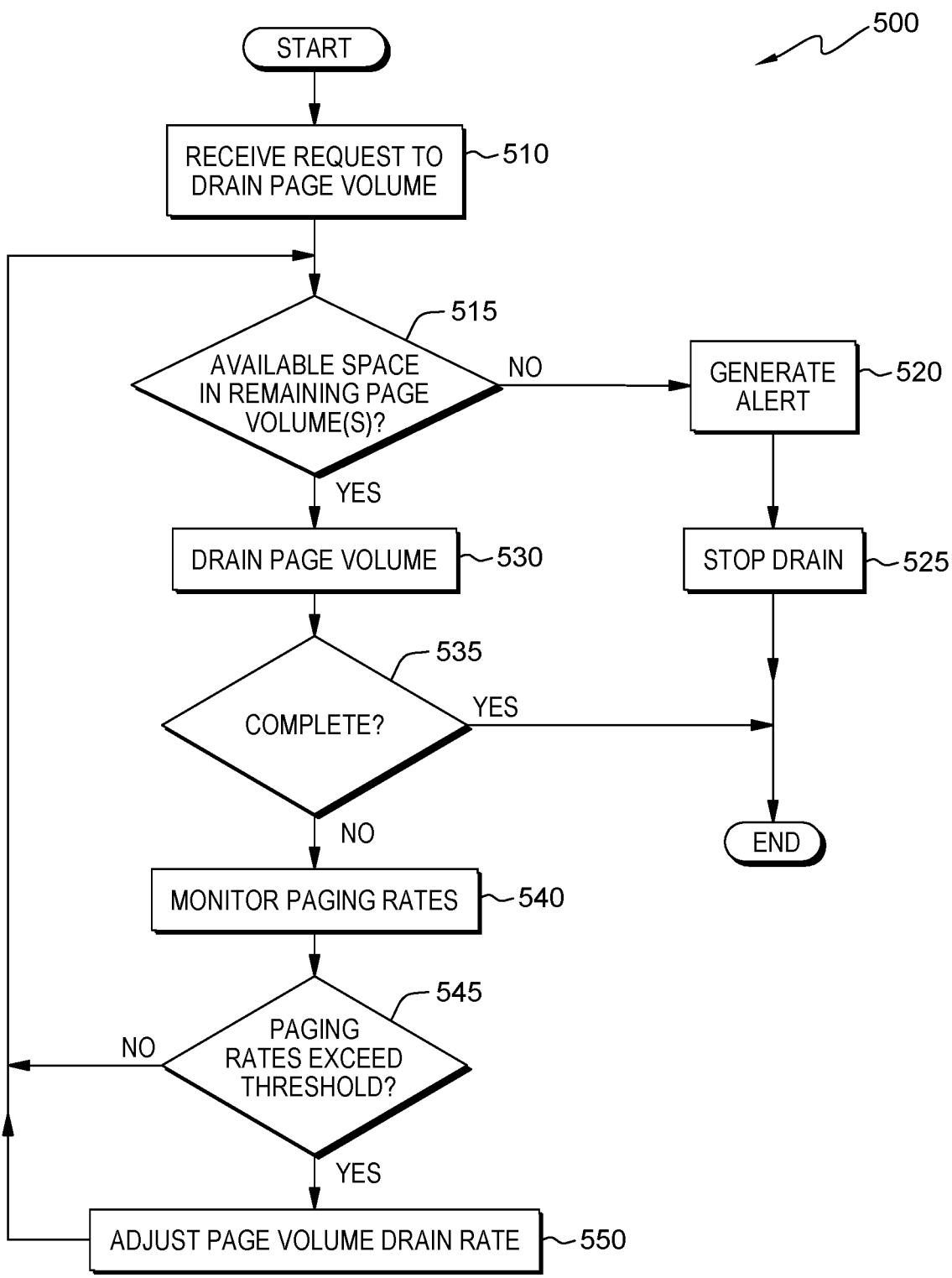
FIG. 5 is a flowchart depicting operational steps for monitoring and managing a drain of a page volume of a secondary storage device according to an embodiment of the present invention.

In one embodiment, the OSs (e.g., OS 152-158) or application software within each LPAR (e.g., LPAR0-LPAR3) and partition management firmware 130 contain machine executable instructions that when executed on processors 112 or service processor 118 carry out the operations depicted in the flowchart of FIG. 5 and other operations described herein. Alternatively, the operations performed by one or more embodiments of the present invention can be performed by specific hardware components that contain hardwired logic for performing the steps, or by any combination of programmed computer components and custom hardware components.

One or more embodiments of the present invention may be downloaded as a computer program product, where the program instructions may be transferred from a remote computer such as a server 140 to requesting data processing system 100 by way of data signals embodied in a carrier wave or other propagation medium via a network link 134 (e.g. a modem or network connection) to a communications interface of data processing system 100. The communications interface provides a two-way data communications coupling to network link 134 that may be connected, for example, to a local area network (LAN), wide area network (WAN), directly to an Internet Service Provider (ISP), or to the cloud. In particular, network link 134 may provide wired and/or wireless network communications to one or more networks or clouds.

Network link 134 in turn provides data communication services through network 102. Network 102 may refer to the worldwide collection of networks and gateways (e.g., the Internet or a cloud) that use a particular protocol, such as transmission control protocol (TCP) and Internet protocol (IP), to communicate with one another. Alternatively, network 102 may refer to a local network, a private network, or other networks created for the distribution of information and computing resources, such as a grid computing network. Network link 134 and network 102 both use electrical, electromagnetic, or optical signals that carry digital data streams. The signals through the various networks and the signals on network link 134 and through the communication interface, which carry the digital data to and from data processing system 100, are exemplary forms of carrier waves transporting the information. In general, network 102 can be any combination of connections and protocols that will support communications between data processing system 100 and server 140.

In one or more embodiments of the present invention, in addition to server 140 providing a computer program product, server 140 may enable a remote management interface for a system administrator or remote manager to direct dynamic reconfiguration commands (e.g., a drain command) to partition management firmware 130 via network 102. In particular, when a system administrator or remote manager chooses to explicitly direct dynamic reconfiguration, partition management firmware 130 receives commands to allocate or deallocate resources to partitions and adjusts the allocation of resources according to the commands.

FIG. 5 depicts a flowchart of the steps of a process for managing the draining of one or more page volumes of a running system, such as data processing system 100. The process depicted by FIG. 5 may be performed by, for example, partition management firmware 130 executing on a processor (e.g., service processor 118) within the virtualized computer environment depicted by FIGS. 1-4. However, embodiments of the present invention recognize that any partition manager, such as a hypervisor, may perform the process.

In an embodiment, initially, one or more LPARs, such as LPAR0-LPAR3, may be running on data processing system 100. Due to, for example, memory-overcommitment, one or more of the LPARs may have paged out memory to one or more page volumes. For example the virtual memory storage of the LPARS may exceed the memory corresponding to partitioned hardware 110 and memory units 114. Accordingly, data may be paged to, for example, storage 120 and/or external storage on server 140, accessible via network 102. As such, data corresponding to one or more LPARs may be located on memory units 114, storage 120, and/or external storage 120.

In step 510, partition management firmware 130 receives a request to drain a page volume. In some embodiments, the request may be generated by an administrative user via a user interface accessible from server 140 or data processing system 100. In other embodiments, the request may be automatically generated based on, for example, a maintenance schedule for the hardware associate with the respective page volume(s). The request may specify at least one particular page volume. Each page volume corresponds to specific hardware storage device(s). The request may be in response to, for example, a system upgrade requiring the removal of hardware associated with one or more page volumes operatively connected to data processing system 100. The request may specify a single page volume or a plurality of page volumes.

In some embodiments, partition management firmware 130 adds the page volume(s) that have been specified by the request to a list. The list may be, for example, a bit list where each page volume corresponds to one bit and if the corresponding bit is on (i.e., "1"), then the corresponding page volume is being drained. Conversely, each respective page volume corresponding to a bit that is off (i.e., "0"), is an active page volume that is not being drained. Active page volumes may be available to receiving data from page volumes that are to be drained. In some embodiments, partition management firmware 130 iterates across address spaces for users (e.g., virtual tenants of the LPARs) to identify if any paged out pages located on page volumes match the volumes that are on the bit list and identified as page volumes to be drained. If partition management firmware 130 identifies a match, then the data (i.e., corresponding page(s)) is to be paged out to a page volume that is not identified to be drained. If partition firmware 130 identifies no matches (i.e., no LPAR virtual tenants are associated with the data), there may already be no data present on the page volumes to be drained, or if data is present on the page volumes to be drained, such data and associated pages may be deleted or otherwise removed from data processing system 100 or server 140.

In decision 515, partition management firmware 130 determines whether there is enough available capacity in remaining active page volume(s) to meet the capacity requirements the data (i.e., pages) stored on the page volumes that have been designated to be drained. In some embodiments, partition management firmware 130 monitors available capacity of page volumes and calculates the amount of capacity required to store the data of the draining page volumes. For example, partition management firmware 130 may recognize that a page volume to be drained contains 5 GB of data, and that one active page volume, multiple active page volumes, or a combination of active page volumes include at least 5 GB of available storage capacity. In some embodiments, a paging threshold warning value may exist. The paging threshold warning value may represent a maximum storage capacity for each page volume. In some embodiments, the paging threshold warning value is a percentage of capacity, for example 90%. In some embodiments, the percentage of capacity is in relation to the combined storage capacity of available page volumes. In other embodiments, the percentage of capacity is with respect to each individual page volume and the capacity of the physical hardware associated with the page volume. Embodiments of the present invention recognize that any paging threshold warning value may be used, and, in some embodiments, no paging threshold warning value may be used (i.e., page volumes will be allowed to utilize 100% of respective capacities).

Partition management firmware 130 may determine whether there is enough available capacity prior to starting the page drain. However, embodiments of the present invention also recognize that subsequent to beginning the page draining process, partition management firmware 130 may determine whether there is enough available capacity in active page volumes. This may be, for example, an iterative process that occurs (i) continuously, (ii) subsequent to the completion of a drain of a first page volume if, for example, multiple page volumes have been identified to be drained, (iii) after each page has been moved to an active page volume or, after a specified number of pages have been moved, or (iv) and iterative process that occurs as a result of other factors.

If partition management firmware 130 determines that there is not enough available space to drain the identified page volumes to one or more active page volumes (decision 515, no branch), partition management firmware 130 generates an alert (step 520). The alert may be a notification sent by partition management firmware 130 to the computing device associated with the request (e.g., data processing system 100; server 140). The alert may, for example, notify the administrative user who generated the request that the draining has been halted and/or will not begin. The alert may also include information as to the cause of the alert. For example, the alert may specify the discrepancy between available storage capacity in the active page volumes and storage capacity required for the requested page volume(s) to be drained.

In step 525, partition management firmware 130 halts draining of any requested page volumes. In some instances, partition management firmware 130 may not yet have begun draining the page volume(s). In other instances, partition management firmware 130 may have been in the midst of draining one or more page volumes that had been previously identified by the request. Upon stopping any in-process draining of page volumes, the process is complete until a subsequent request is received.

If partition management firmware 130 determines that there is enough available space in the remaining active page volume(s) to drain the requested page volume(s) (decision 515, yes branch), partition management firmware 130 causes the requested page volume(s) to drain to available active page volume(s) (step 530). In step 530, partition management firmware 130 may be initiating the requested page volume drain. However, in step 530, partition management firmware 130 may also merely be allowing the requested page volume drain to continue, for example, in an iteration subsequent to the initialization of the page drain (see loop created by steps 530-545, no branch). In some embodiments, partition management firmware actively manages the paging out of pages from a draining page volume to an active remaining page volume. If multiple page volumes are being drained and/or multiple active remaining page volumes exist, partition management firmware 130 may identify and select target page volumes in order to coordinate and process the transfer of data (i.e., pages).

In decision 535, partition management firmware 130 determines if the page draining request has been fulfilled to completion. In some embodiments, partition management firmware 130 may determine whether the page draining request is complete by determining that all pages from the requested page volumes have been successfully transferred to one or more other page volumes. In some embodiments, partition management firmware 130 may determine whether the page draining request is complete by monitoring the paging rates of the draining page volumes and, for example, if the paging rates indicate that paging out from such draining page volumes has ceased, partition management firmware 130 may determine that the request has been fulfilled to completion.

If partition management firmware 130 determines that the page draining request has been fulfilled to completion (decision 535, yes branch), the process is complete. If partition management firmware 130 determines that the page draining request has not yet been completed (decision 535, no branch), partition management firmware 130 monitors paging rates (step 540). Partition management firmware 130 may monitor paging rates of primary storage (e.g., memory units 114) to secondary storage, such as any of the page volumes described herein. In some embodiments, partition management firmware 130 monitors page rate acceleration changes and/or page rate changes in general. Page rate acceleration could indicate increased activity of one or more virtual tenants on any of LPAR0-LPAR3, therefore impacting the actual hardware of data processing system 100. For example, increased workloads by virtual tenants at any of LPAR0-LPAR3 may result in an increase in the use of the primary memory, potentially causing overcommitment. Such overcommitment may result in partition management firmware 130 paging out data associated with LPAR0-LPAR3 to one or more page volumes.

In decision 545, partition management firmware 130 determines whether paging rates exceed a threshold. In some embodiments, the threshold is a page rate acceleration threshold. For example, the page rate acceleration threshold may be based on an acceleration in monitored page frames paging out to secondary storage (e.g., page volumes) over a period of time. A paging rate threshold may be modifiable, but generally will be established by an administrative user of data processing system 100. Partition management firmware 130 may determine whether paging rates have exceeded the threshold based on monitoring paging rates (see step 540).

If partition management firmware 130 determines that the paging rates do not exceed the threshold (decision 545, no branch), partition management firmware 130 iterates back to decision 515 and determines whether there is still available pace in the remaining page volume(s) for data that is to be transferred from draining page volumes.

If partition management firmware 130 determines that the paging rates do exceed the threshold (decision 545, yes branch), partition management firmware 130 adjusts the rate at which the page volume(s) drain. In some embodiments, partition management firmware 130 slows or decreases the rate at which one or more page volumes drain to remaining active page volume(s). Partition management firmware 130 may decrease the rate at which the page volume(s) drain by using fewer frames for the paging. In some embodiments, if attempts to decrease the number of frames used for paging do not cause the paging rates to fall below the threshold, partition management firmware 130 may pause, or otherwise suspended, the page draining. For example, partition management firmware 130 may pause page draining if, once the draining has been adjusted to only use one frame for paging, the paging rates continue to exceed the threshold. Subsequent to suspending the page draining and/or decreasing the rate of the page draining, embodiments of the present invention may continue to monitor paging rates and, upon the paging rates falling below the threshold, partition management firmware 130 may resume and/or increase the page volume drain rate.

Subsequent to adjusting page volume drain rates (see step 550), partition management firmware 130 iterates back to decision 515 and, again, determines available space in remaining page volume(s). In some embodiments, partition management firmware 130 may continue processing the request, as described, until (i) the request has been completed, (ii) there is no longer enough available capacity in remaining page volumes to fulfill the request, or (iii) paging has been halted due to paging rates exceeding the threshold.

FIGS. 6-11 depict example block diagrams described in further detail below. It should be noted that FIGS. 6-11 depict merely examples of embodiments of the present invention and should not be viewed as limiting the scope of the present invention For example, (i) any number and capacity of page volumes and primary memory may exist, and (ii) page volumes may each have the same capacity, or may have different capacities.

Figure 6:
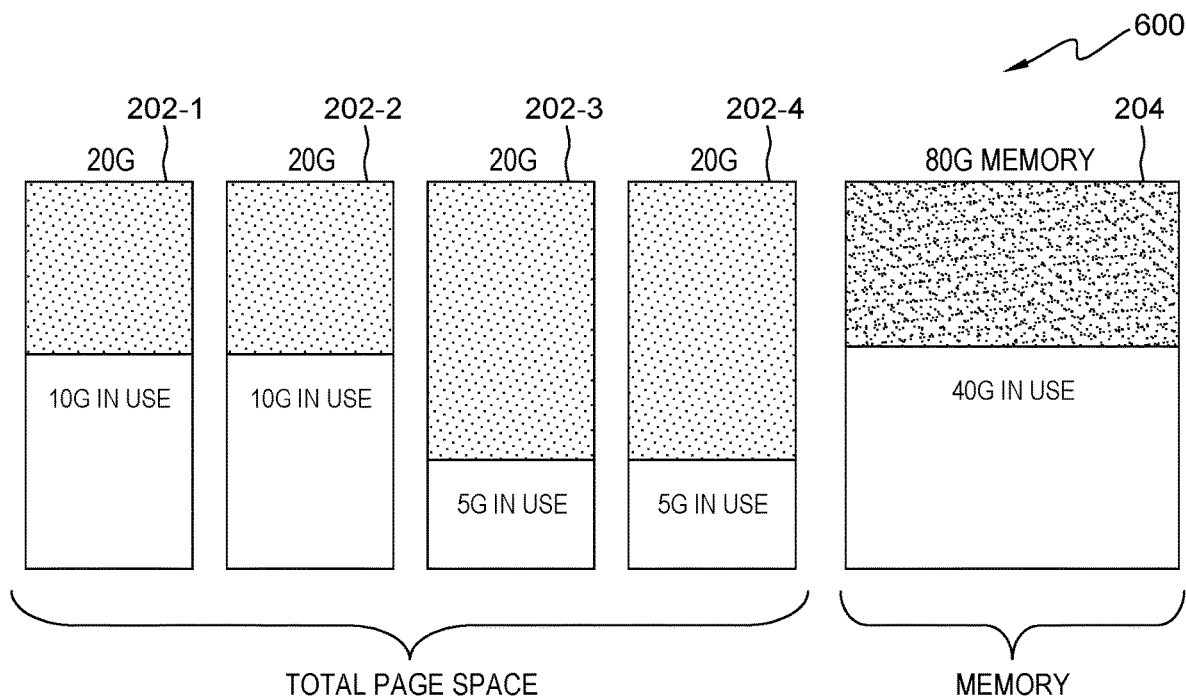
FIG. 6 is a block diagram of page volumes and main memory of a virtual machine (VM) according to an embodiment of the present invention.

FIG. 6 is a block diagram 600 of (i) primary memory 204 and (ii) page volumes 202-1 through 202-4 that make up a total page space of a VM system, such as data processing system 100, in accordance with an embodiment of the present invention. In the depicted example, there are four page volumes (202-1, 202-2, 202-3, and 202-4) referred to collectively as page volumes 202. Page volumes 202 may be located on data processing system 100 or another server (e.g., server 140). Each page volume 202 has a total capacity of twenty gigabyte (20G). The primary memory of data processing system 100 has a total capacity of 80G and represents the total primary storage of data processing system 100. At the point in time depicted by FIG. 6, (i) page volumes 202-1 and 202-2 each have 10G in use and 10G of free space, (ii) page volumes 202-3 and 202-4 each have 5G in use and 15G of free space, and (iii) primary memory 204 has 40G in use and 40G of free space.

Figure 7:
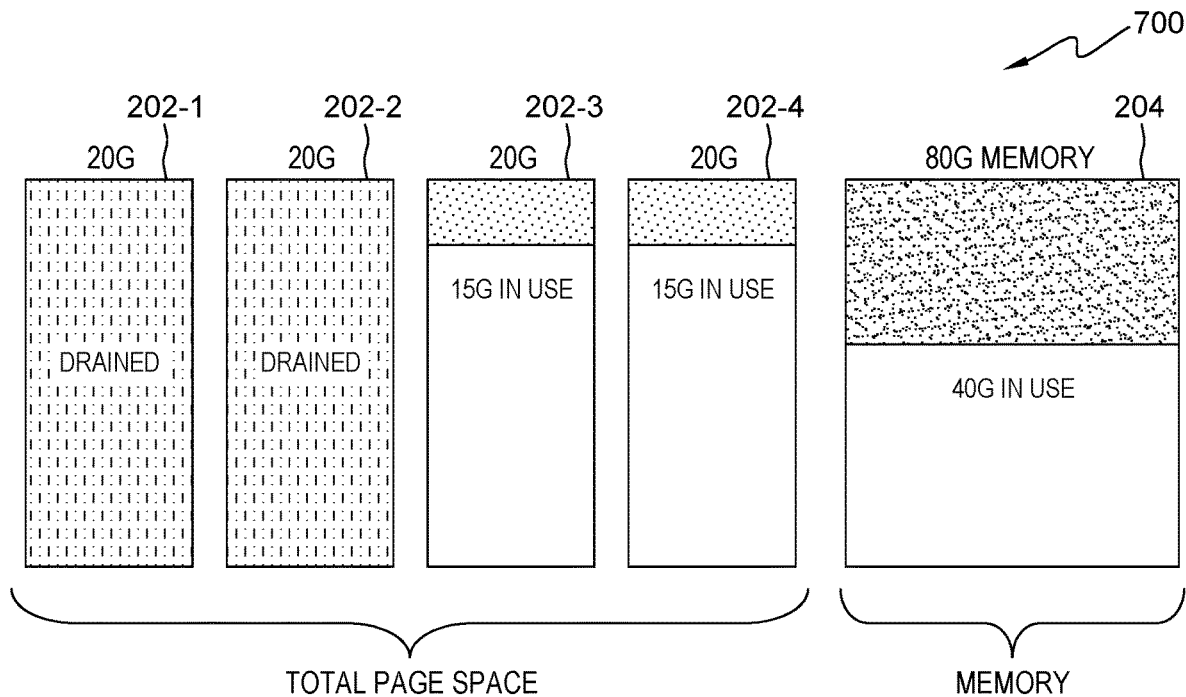
FIG. 7 is a block diagram of page volumes and main memory of a VM after two page volumes have been drained and the data moved to the remaining active page volumes according to an embodiment of the present invention.

FIG. 7 is a block diagram 700 of the page volumes and primary memory of FIG. 6 after page volumes 202-1 and 202-2 have been drained by partition management firmware 130 in response to a received request. As depicted, page volumes 202-1 and 202-2 have been drained and the data has been moved to page volumes 202-3 and 202-4. Accordingly, page volumes 202-1 and 202-2 no longer include data and can be disconnected from data processing system 100 and/or server 140 without risking data loss to VM guests. As a result of the draining of page volumes 202-1 and 202-2, page volume 202-3 now has 15G in use and 5G of free space.

Figure 8:
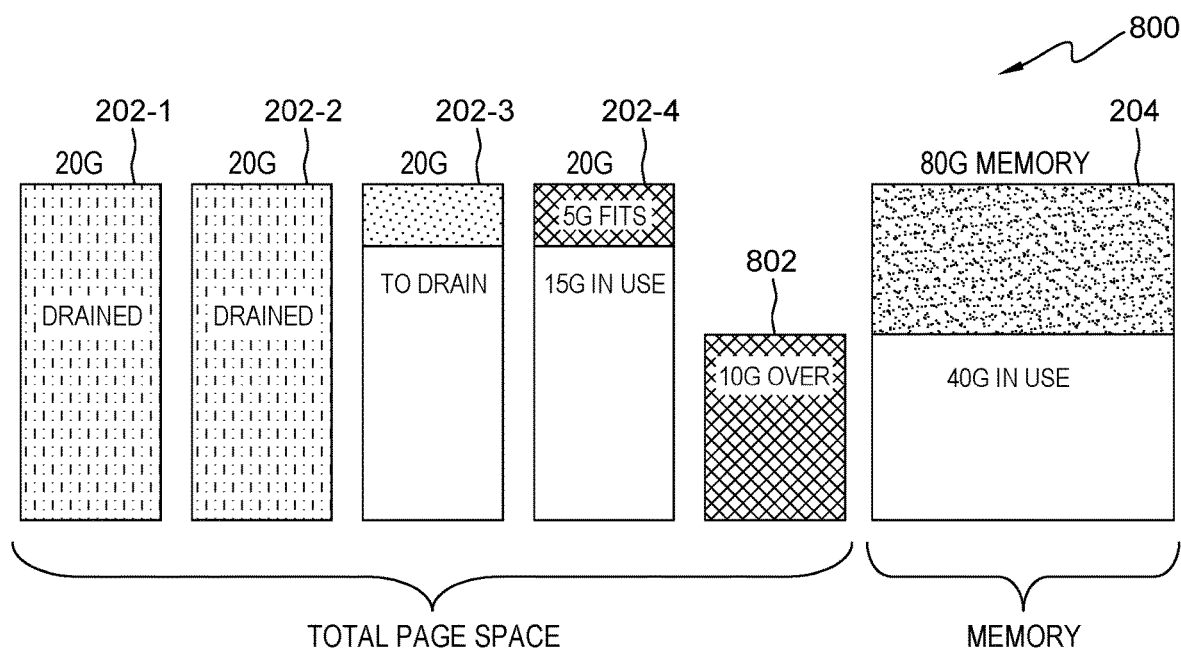
FIG. 8 is a block diagram of page volumes and main memory of a VM illustrating hypothetical results of an attempt to drain a page volume that includes data exceeding the available capacity of the remaining active page volumes according to an embodiment of the present invention.

FIG. 8 is a block diagram 800 of the page volumes and primary memory of FIG. 7 depicting a scenario in which page volume 202-3 is also requested to be drained to the remaining active page volume 202-4. Partition management firmware 130 calculates the available capacity of remaining active page volumes, which in the depicted embodiment, is the 5G of free space in page volume 202-4, and determines that there is 10G of data that exceeds the available capacity, as depicted in FIG. 8 as data excess 802.

Figure 9:
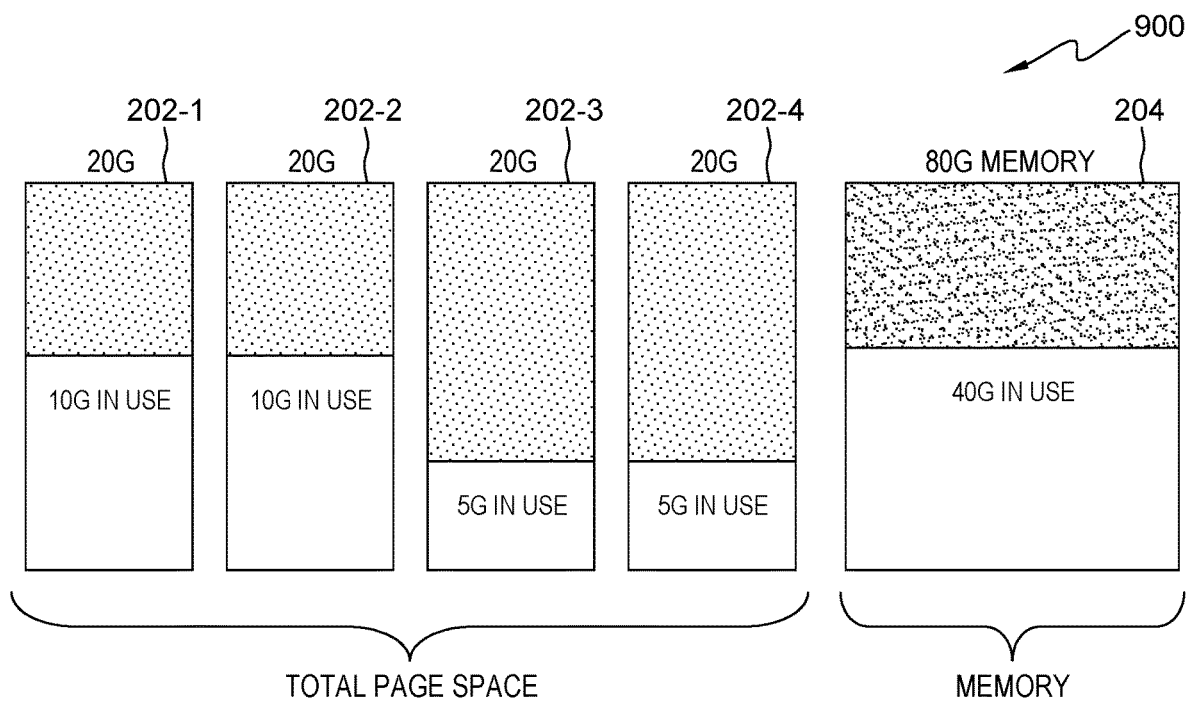
FIG. 9 is a block diagram of page volumes and main memory of a VM according to an embodiment of the present invention.

FIG. 9 is a block diagram 900 of (i) primary memory 204 and (ii) page volumes 202-1 through 202-4 that make up a total page space of a VM system, such as data processing system 100, in accordance with an embodiment of the present invention. In the depicted example, there are four page volumes (202-1, 202-2, 202-3, and 202-4) referred to collectively as page volumes 202. Page volumes 202 may be located on data processing system 100 or another server (e.g., server 140). Each page volume 202 has a total capacity of twenty gigabyte (20G). The primary memory of data processing system 100 has a total capacity of 80G and represents the total primary storage of data processing system 100. At the point in time depicted by FIG. 9, (i) page volumes 202-1 and 202-2 each have 10G in use and 10G of free space, (ii) page volumes 202-3 and 202-4 each have 5G in use and 15G of free space, and (iii) primary memory 204 has 40G in use and 40G of free space. In FIG. 9, due to workloads increasing by VM guests, 30G is going to have to be paged out from primary memory 204 to page volumes 202. In addition, partition management firmware 130 has received a request to drain page volume 202-1.

Figure 10:
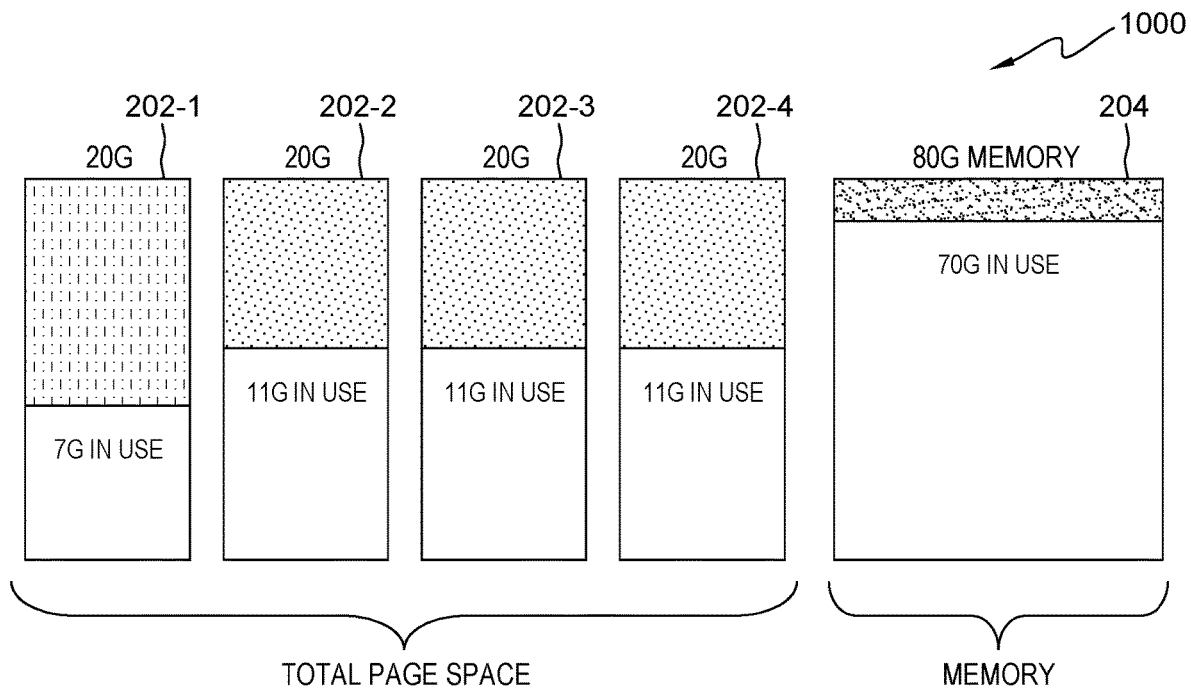
FIG. 10 is a block diagram of page volumes and main memory of a VM as a page volume is draining to the remaining active page volumes while workloads are increasing at the main memory.

FIG. 10 is a block diagram 1000 of the page volumes and primary memory of FIG. 9 after page volume 202-1 has started to drain and transferred 3G of data to page volumes 202-2 through 202-4. In addition, 10G of data from primary memory 204 has been paged out to page volumes 202-2 through 202-4. Therefore, at the point in time depicted by FIG. 10, 20G of data from primary memory 204 is still in the process of being paged out to page volumes 202-2 through 202-4 and the 7G that remains in page volume 202-1 is still awaiting transfer such that page volume 202-1 can be completed drained. A workload increase is depicted, resulting primary memory 204 having 70G in use and 10G free space. In embodiments of the present invention, partition management firmware 130 may recognize the workload increase and slow the rate at which page volume 202-1 transfers data to page volumes 202-2 through 202-4. In some instances, partition management firmware 130 may cause page volume 202-2 to pause any data transfer. Pausing data transfer may prevent page volumes 202-2 through 202-4 from potentially becoming full as a result of the combination of paging out from primary memory 204 and draining page volume 202-1.

Figure 11:
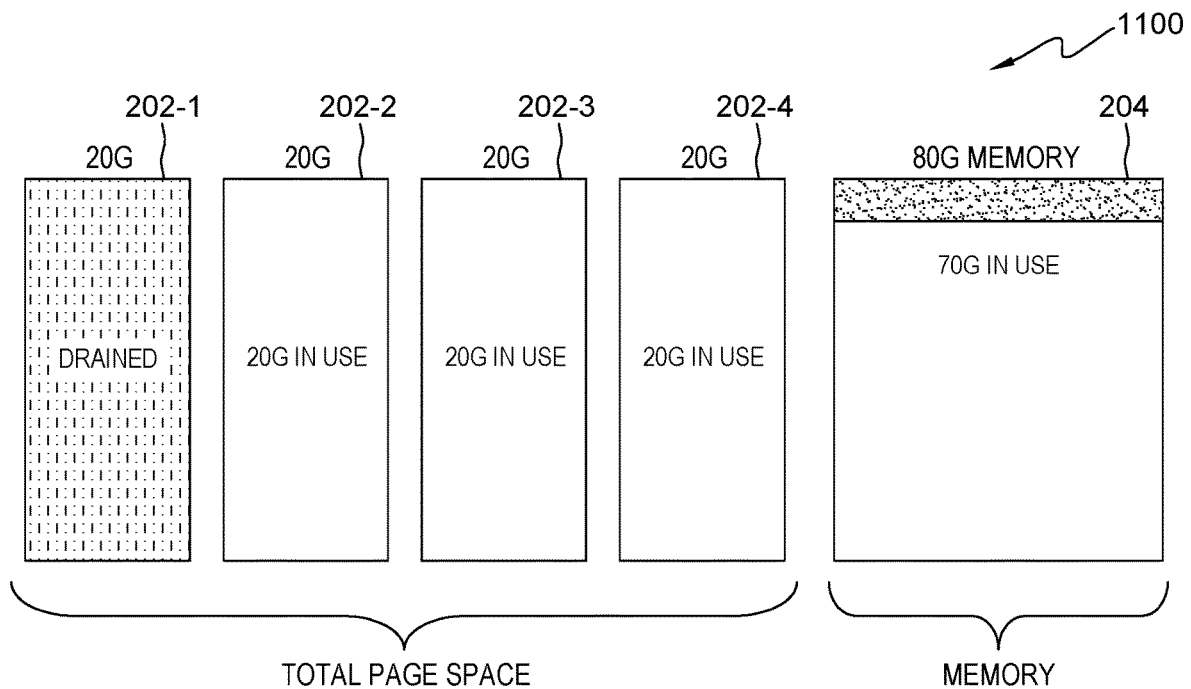
FIG. 11 is a block diagram of page volumes and main memory of a VM after a page volume has drained and increased workloads of the main memory have been paged out to the page volumes.

FIG. 11 is a block diagram 1100 of the page volumes and primary memory of FIG. 10 after the remaining 20G of data from primary memory 204 has paged out to page volumes 202-2 through 202-4 and page volume 202-1 has completed draining to page volumes 202-2 through 202-4. Page volume 202-1 may have resumed draining after partition management firmware 130 determined that the workload resulting from the paging out of primary memory 204 had slowed or completed. At the point in time depicted by FIG. 11, page volumes 202-2 through 202-4 are at full capacity (20G) and primary memory 204 has 70G in use and 10G of free space. As depicted, no paging threshold warning volume is used. Accordingly, the page volumes are allowed to be at full capacity. If, for example, a 90% paging threshold warning value was in place for each of page volumes 202, partition management firmware 130 would have only allowed each page volume 202 to store 18G out of the 20G total storage capacity.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a request to vacate a first page volume of a plurality of page volumes;

causing, by one or more processors, data stored to the first page volume to be moved to a second page volume of the plurality of page volumes;

monitoring, by one or more processors, paging rate between a primary storage device and the plurality of page volumes; and responsive to the paging rate exceeding a first predetermined threshold, adjusting, by one or more processors, a rate of data transfer from the first page volume to the second page volume.

2. The computer-implemented method of claim 1, further comprising:

monitoring, by one or more processors, available capacity of the plurality of page volumes, excluding the first page volume.

3. The computer-implemented method of claim 2, further comprising:

determining, by one or more processors, that the available capacity of the plurality of page volumes, excluding the first page volume, is insufficient based on an amount of data stored to the first page volume;

generating, by one or more processors, an alert to a user; and halting, by one or more processors, data transfer from the first page volume to the second page volume.

4. The computer-implemented method of claim 2, further comprising:

determining, by one or more processors, that the available capacity of the plurality of page volumes, excluding the first page volume, is sufficient based on an amount of data stored to the first page volume; and wherein causing the data stored to the first page volume to be moved to the second page volume is responsive to determining that the available capacity of the plurality of page volumes, excluding the first page volume, is sufficient.

5. The computer-implemented method of claim 2, wherein the available capacity of the plurality of page volumes, excluding the first page volume, is based on a second predetermined threshold, wherein the second predetermined threshold is a percentage of total capacity of each of the plurality of page volumes.

6. The computer-implemented method of claim 1, wherein the first threshold is a rate of acceleration in paging rate between the primary storage device and the plurality of page volumes.

7. The computer-implemented method of claim 1, wherein adjusting the rate of data transfer comprises decreasing the rate of data transfer from the first page volume to the second page volume.

8. A computer program product comprising:

one or more computer readable storage media, and program instructions collectively stored on the one or more computer readable storage media, the program instructions comprising:

program instructions to receive a request to vacate a first page volume of a plurality of page volumes;

program instructions to cause data stored to the first page volume to be moved to a second page volume of the plurality of page volumes;

program instructions to monitor paging rate between a primary storage device and the plurality of page volumes; and program instructions to, responsive to the paging rate exceeding a first predetermined threshold, adjust a rate of data transfer from the first page volume to the second page volume.

9. The computer program product of claim 1, further comprising:

program instructions, collectively stored on the one or more computer readable storage media, to monitor available capacity of the plurality of page volumes, excluding the first page volume.

10. The computer program product of claim 9, further comprising:

program instructions, collectively stored on the one or more computer readable storage media, to determine that the available capacity of the plurality of page volumes, excluding the first page volume, is insufficient based on an amount of data stored to the first page volume;

program instructions, collectively stored on the one or more computer readable storage media, to generate an alert to a user; and program instructions, collectively stored on the one or more computer readable storage media, to halt data transfer from the first page volume to the second page volume.

11. The computer program product of claim 9, further comprising:

program instructions, collectively stored on the one or more computer readable storage media, to determine that the available capacity of the plurality of page volumes, excluding the first page volume, is sufficient based on an amount of data stored to the first page volume; and wherein program instructions to cause the data stored to the first page volume to be moved to the second page volume is responsive to determining that the available capacity of the plurality of page volumes, excluding the first page volume, is sufficient.

12. The computer program product of claim 9, wherein the available capacity of the plurality of page volumes, excluding the first page volume, is based on a second predetermined threshold, wherein the second predetermined threshold is a percentage of total capacity of each of the plurality of page volumes.

13. The computer program product of claim 8, wherein the first threshold is a rate of acceleration in paging rate between the primary storage device and the plurality of page volumes.

14. The computer program product of claim 8, wherein program instructions to adjust the rate of data transfer comprise program instructions to decrease the rate of data transfer from the first page volume to the second page volume.

15. A computer system comprising:

one or more computer processors, one or more computer readable storage media, and program instructions collectively stored on the one or more computer readable storage media for execution by at least one of the one or more computer processors, the program instructions comprising:

program instructions to receive a request to vacate a first page volume of a plurality of page volumes;

program instructions to cause data stored to the first page volume to be moved to a second page volume of the plurality of page volumes;

program instructions to monitor paging rate between a primary storage device and the plurality of page volumes; and program instructions to, responsive to the paging rate exceeding a first predetermined threshold, adjust a rate of data transfer from the first page volume to the second page volume.

16. The computer system of claim 15, further comprising:
program instructions, collectively stored on the one or more computer readable storage media for execution by at least one of the one or more computer processors, to monitor available capacity of the plurality of page volumes, excluding the first page volume.

17. The computer system of claim 16, further comprising:
program instructions, collectively stored on the one or more computer readable storage media for execution by at least one of the one or more computer processors, to determine that the available capacity of the plurality of page volumes, excluding the first page volume, is insufficient based on an amount of data stored to the first page volume;
program instructions, collectively stored on the one or more computer readable storage media for execution by at least one of the one or more computer processors, to generate an alert to a user; and
program instructions, collectively stored on the one or more computer readable storage media for execution by at least one of the one or more computer processors, to halt data transfer from the first page volume to the second page volume.

18. The computer system of claim 16, further comprising:
program instructions, collectively stored on the one or more computer readable storage media for execution by at least one of the one or more computer processors, to determine that the available capacity of the plurality of page volumes, excluding the first page volume, is sufficient based on an amount of data stored to the first page volume; and
wherein program instructions to cause the data stored to the first page volume to be moved to the second page volume is responsive to determining that the available capacity of the plurality of page volumes, excluding the first page volume, is sufficient.

19. The computer system of claim 16, wherein the available capacity of the plurality of page volumes, excluding the first page volume, is based on a second predetermined threshold, wherein the second predetermined threshold is a percentage of total capacity of each of the plurality of page volumes.

20. The computer system of claim 15, wherein the first threshold is a rate of acceleration in paging rate between the primary storage device and the plurality of page volumes.

* * * * *